United States Patent
Nassif

(10) Patent No.: US 7,476,317 B2
(45) Date of Patent: Jan. 13, 2009

(54) HYDROCYCLONE FOR DOWN-HOLE USE

(75) Inventor: Naji Nassif, Cordova, TN (US)

(73) Assignee: Gnesys, Inc., Memphis, TN (US)

( * ) Notice: Subject to any disclaimer, the term of this patent is extended or adjusted under 35 U.S.C. 154(b) by 515 days.

(21) Appl. No.: 10/550,833

(22) PCT Filed: Jul. 24, 2003

(86) PCT No.: PCT/US03/23311

§ 371 (c)(1),
(2), (4) Date: Mar. 3, 2006

(87) PCT Pub. No.: WO2004/096406

PCT Pub. Date: Nov. 11, 2004

(65) Prior Publication Data

US 2006/0186038 A1    Aug. 24, 2006

(51) Int. Cl.
*B01D 17/038* (2006.01)
*E21B 43/38* (2006.01)

(52) U.S. Cl. .............. 210/512.1; 210/170.01; 210/416.1; 210/416.5; 210/788; 166/265; 96/209; 96/212; 96/216; 55/396; 55/399; 55/456; 55/459.1; 55/459.3

(58) Field of Classification Search ........... 210/170.01, 210/416.1, 416.5, 512.1, 788; 166/265; 96/209, 96/212, 216; 55/396, 399, 456, 459.1, 459.3
See application file for complete search history.

(56) References Cited

U.S. PATENT DOCUMENTS

| | | | |
|---|---|---|---|
| 2,147,671 A | 2/1939 | Pratt | |
| 5,296,153 A | 3/1994 | Peachey | 210/787 |
| 5,431,228 A | 7/1995 | Weingarten et al. | 166/357 |
| 6,019,825 A | 2/2000 | Greene et al. | 96/209 |
| 6,036,749 A | 3/2000 | Ribeiro et al. | |
| 2002/0112998 A1 | 8/2002 | Bosman | |

FOREIGN PATENT DOCUMENTS

EP        0 436 973 A2    7/1991

*Primary Examiner*—David A Reifsnyder

(57) ABSTRACT

Hydrocyclone (1) for separating an input stream (8) of two immiscible liquids having a stream inlet (18) an inner shell (3) and an outer shell (4) concentric with the longitudinal axis (5) of the hydrocyclone (1), a cyclone chamber is defined by the shells (3,4), encircles the axis (5) and has an entrance (7), an expansion chamber (9) which reduces the velocity of the input stream (8) by the time it reaches the entrance (7) is between the stream inlet (18) and the entrance (7). The dimensions of the hydrocyclone are selected so that the hydrocyclone (1) has a radius not more than 30% greater than the radius of the outer shell (4) and lies within a circle in a plane perpendicular to and centered on the axis (5), therefore the hydrocyclone (1) can be readily lowered into a well casing (2) in the ground.

29 Claims, 4 Drawing Sheets

HYDROCYCLONE FOR DOWN-HOLE USE

BACKGROUND OF THE INVENTION

1. Field of the Invention

The invention relates to a hydrocyclone apparatus for separating the constituents of a mixed phase input stream, such as, for example, separation of two immiscible liquids. Separation is effected by reason of the difference of the specific gravities of the constituents, which are subjected to centrifugal force as the stream is directed along a helical path between an inlet and outlets.

2. Description of Prior Art

Hydrocyclones are well known in the art. See, for example, U.S. Pat. No. 6,019,825 issued Feb. 1, 2000 to the assignee of this application and the disclosure of which is incorporated herein by reference. Numerous patents relating to hydrocyclones are listed on said patent.

In general, a hydrocyclone comprises a chamber which, for example, can be formed by a pair of concentric spaced walls which are long relative to their diameters, and each of which can be of the same diameter along its length or of decreasing diameter in the direction from the top inlet and to the bottom heavy liquid outlet end of the chamber. A mixed stream, e.g. consisting of heavy, or high density, liquid and a light, or low density liquid, is directed into the chamber, near or at the top of the chamber, at very high velocity and follows a helical path from the point at which the stream enters the chamber to the lower end of the chamber. The helical path flow can be augmented by a helical vane or tube between the chamber walls. The stream constituents are subjected to centrifugal force as they traverse the helical path so that the heavier constituents move outwardly toward the outer wall and the lighter constituents migrate toward the inner wall.

There comes a time in the pumping of many oil wells when the liquid in the well is much less than 50% oil, the remainder being mainly water or brine. Thus, the liquid may contain 5% oil and 95% brine. Under the latter conditions, it can be uneconomical to process the liquid above ground, i.e. to provide a hydrocyclone separator above ground and to pump the liquid from the liquid pool thousands of feet below ground to the hydrocyclone above ground. In addition, the separated liquid and solids, other than the oil, must be disposed of which involves further expense, particularly because of ecological restrictions with respect to disposing of such liquids and solids.

Therefore, it can be desirable to treat the low oil content liquid with a hydrocyclone disposed below ground in the bore of the well pipe because when the hydrocyclone is so located, it is unnecessary to pump the entire untreated liquid to the surface of the ground and the undesired liquids and solids can merely be returned to the liquid pool at the bottom of the well pipe.

However, the bore of the well pipe may be only about five inches in diameter which limits the maximum exterior dimensions of the hydrocyclone and the connections thereto. Thus, if the connections, e.g. pipe fittings, extend radially outwardly of the hydrocyclone chamber outer wall, the diameter of the outer wall must be decreased to enable the hydrocyclone and its connections to fit within the pipe. The diameter of the outer wall can be reduced only a limited amount if adequate flow within the cyclone is to be achieved.

In addition, there are some drilling operations in which the drilling is vertical at the beginning and then is horizontal or close to horizontal. In such cases, there is a curved transition portion between the vertical and horizontal portions which may, for example, have a radius of about forty feet. If the hydrocyclone is to be positioned in the horizontal portion of the well bore, the exterior dimension of the hydrocyclone and its connections and the length of the hydrocyclone must be selected so that the combination can be fed through the curved transition portion. Accordingly, it is desirable to keep such exterior dimension to a minimum.

A hydrocyclone requires an inlet connection for the input stream and at least one outlet connection for a separated constituent is required. When the apparatus is installed in a hole, a conduit, such as a flexible hose, is required from the outlet to a point above ground. In some prior art hydrocyclones, the inlet connection extends radially from the apparatus to permit directing the stream tangentially to the chamber walls. Also, in the prior art, the outlet connection may extend radially from the apparatus. Both such radially extending connections can undesirably restrict the maximum diameter of the chamber for a given hole size.

It has been proposed that the inlets and outlets of a hydrocyclone be located substantially within, or within, a projection of the periphery of the chamber so that the apparatus has substantially the same outer size throughout its length. See, for example, U.S. Pat. Nos. 2,147,671 and 5,431,228.

In the apparatus in U.S. Pat. No. 2,147,671 in which the inlet connection is substantially within a projection of the periphery of the outer wall of the chamber (FIG. 5), the cylindrical stream directly impinges on the helical plate and is not directed at the angle of the helical plate, i.e. the stream is directed at an angle to the plate. There is no transition region between the stream inlet and the helical plate. As a result, the sudden change in stream path will cause undesirable disturbances in the stream which may persist for several turns of the helical path. A smooth transition from the inlet to the helical path is very important for establishing fully developed and desired flow at or near the beginning of the helical path to increase the useful portion of the hydrocyclone.

Although U.S. Pat. No. 5,431,228 shows hydrocyclone inlets and outlets within the projection of the outer wall of the cyclone chamber, the connections to the inlet and outlet are above ground so that it is not necessary that the connections fit within the well pipe and the connections are not so described. In addition, the inlet of the hydrocyclone is of the same size as the diameter of the outer wall of the cyclone and is coaxial with the cyclone helix. Also, the distance between the inner side of the chamber outer wall and the periphery of the helix support rod is relatively large.

SUMMARY OF THE INVENTION

The present invention comprises a hydrocyclone for effecting separation of the constituents of a multi-phase input stream with an input orifice or opening and a light liquid outlet oriented so that the combination of the hydrocyclone with connectors connected to the input orifice and the outlet can fit within a down-hole or well pipe or casing. Preferably, the input orifice is smaller than the diameter of the hydrocyclone and the orifice can be oriented so that the input stream is directed substantially parallel to, but offset from, the axis of the cyclone. A plenum, or expansion chamber, is provided intermediate the orifice and the beginning of the helical path portion of the hydrocyclone so that the velocity of the stream is reduced, preferably, to one-half or less of the velocity at the orifice, before entering the helical path portion.

The light liquid outlet comprises a duct or pipe which extends from a duct formed by the inner wall of the hydrocyclone chamber to a projection of the outer wall of the chamber. The pipe passes through the plenum and opens, at its end remote from the duct, in the direction of the cyclone axis.

Thus, when liquid transport lines are connected to the inlet orifice and the outlet, the cross-sectional size of the hydrocyclone and its connections is not greater than, or not significantly greater than, the cross-sectional size of the hydrocyclone outer wall.

In the preferred embodiments, the hydrocyclone also has a high density constituent outlet at its lower end for the removal of high density constituents, such as brine and/or sediments, and the latter outlet opens into the liquid pool at the lower end of the hydrocyclone.

If the pressure of the liquid in which the hydrocyclone is immersed is sufficient to provide the desired flow for proper separation of the constituents in the cyclone, the input orifice can be, but need not be, oriented as described hereinbefore and instead, can be an opening in the side wall of the plenum.

If the pressure of the liquid in which the hydrocyclone is immersed is not sufficient to provide the desired flow for proper separation, the desired difference of pressure between the input and output ends of the helical path can be provided by a submersible pump supplying the liquid to the input orifice, a submersible pump connected to the light liquid outlet and/or the heavy liquid output or all three.

If the hydrocyclone and its connectors are to be disposed beyond a bend in a well pipe, i.e. as on a side-drilled well, the length and cross-sectional dimensions of the hydrocylone and its connectors are selected so that the hydrocyclone can be fed through such bend.

BRIEF DESCRIPTION OF THE DRAWINGS

The invention will be better understood from the following description of preferred embodiments thereof which should be considered in connection with the accompanying drawings in which.

DETAILED DESCRIPTION OF PREFERRED EMBODIMENTS

Figure 1:
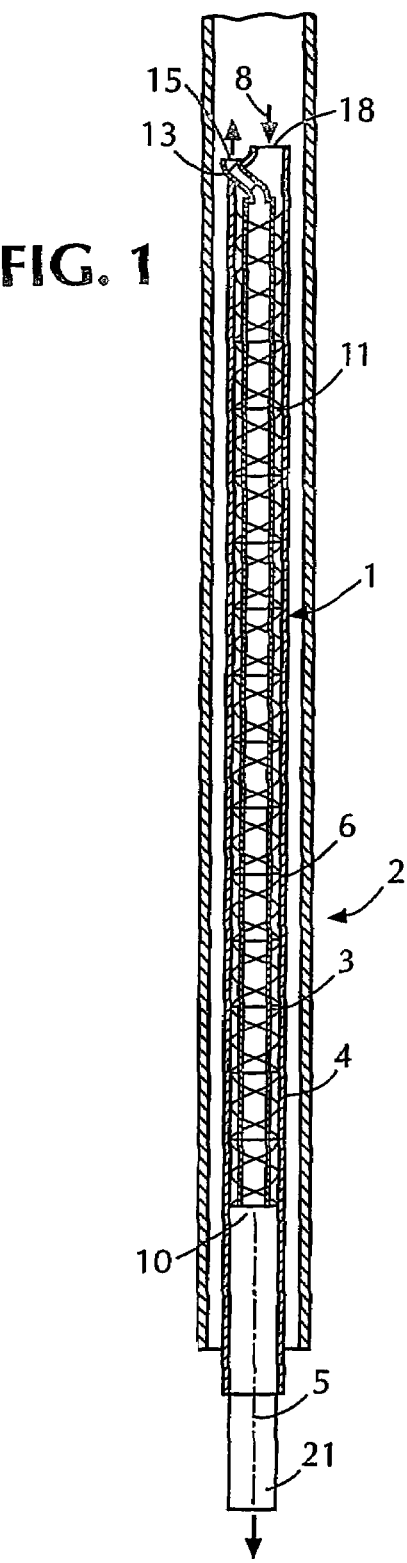
FIG. 1 is a diagrammatic elevation view, partly in cross-section, of the hydrocyclone of the invention in an oil well pipe.

FIG. 1 illustrates schematically, and primarily in cross-section, a hydrocyclone 1 disposed in a well pipe 2 or casing. For purposes of illustration, it will be assumed that the pipe 2 is filled with a two phase liquid to be treated and that the hydrocyclone 1 is completely submerged in such liquid. Such liquid can be, for example, a mixture of oil and brine with the brine constituting most of the mixture. The mixture can also contain a small amount of solids.

The hydrocyclone 1 comprises an inner shell 3 with a radius less than the radius of an outer shell 4 and both of which are concentric with the longitudinal axis 5 of the hydrocyclone 1. The inner surface of the outer shell 4 is spaced from the outer surface of the inner shell 3 and the spacing is substantially less than the radius of the inner surface of the outer shell 4. Preferably, the spacing, in the direction radially of the axis 5, is less than about two-thirds of the radius of the inner surface of the outer shell 4. The spacing can be less than one-half of the dimension of one full turn of the helical path of the stream, hereinafter described, in the direction of the axis 5.

A cyclone chamber 6 is radially defined by the inner and outer shells 3 and 4. The chamber 6 has an inlet or input opening 7 between shells 3 and 4 to which the liquid input stream, indicated by the arrow 8, is supplied through a plenum, or expansion chamber, 9. At the opposite end of the chamber 6, there is an outlet or output opening 10 out of which separated constituents of the input stream flow.

The cyclone chamber 6 can be configured in several different ways. Preferably, the chamber 6 has therein one or more helically wound partitions illustrated schematically at 11. Such partitions 11 are known in the art and can be flat strips or tubing helically wound and providing one or more helical cyclone channels or paths between the inner shell 3 and the outer shell 4. The partitions 11 can be continuous or segmental, e.g. formed by lengths of helical partition separated from each other in the direction of the hydrocyclone 1. The function of the partitions 11 is, as is well known in the art, to cause the liquid supplied to the chamber input opening 7 to follow a helical path from such opening to the output opening 10.

Although the shells 3 and 4 have been illustrated as hollow cylinders or tubes of constant diameter bore, the shells 3 and 4 can be conical as illustrated and described in said U.S. Pat. No. 6,019,825. Also, the shells 3 and 4 can be cylindrical from adjacent the chamber input opening 7 to part way toward the output opening 10 and then be conical for the remainder of the length of the chamber 6.

The inner shell 3 is hollow from end-to-end to provide a duct 12 for conveying light density stream constituent or constituents, such as oil, from the output opening 10 to adjacent the input opening 7 where such constituent enters a pipe or tube 13 which extends exteriorly of the wall 14 of the plenum 9. The tube 13 is, in effect, an extension of the inner shell 3 and is sealed to the wall 14 in liquid tight relation. The tube 13 also is sealed to the end 3a of the inner shell 3. The tube 13 can be circular in cross-section, as shown in the drawings, but the portion thereof within the chamber 9 (or 9a—FIG. 3 or 9b—FIG. 4) can be modified in shape, e.g. non-circular, to reduce turbulence in the input stream.

The tube 13 has an opening 15 exteriorly of the wall 14 of the chamber 9 which, preferably, opens in the direction parallel to the axis 5, as shown in the drawings, so that any connector, such as the connector 16 for a hose or pipe 17, need not extend radially outwardly from the hydrocyclone 1. Light density liquid or liquids separated from the input stream can be conveyed to above ground by the hose 17. If desired, or found to be necessary, the hose 17 can be connected to a submersible pump to force the light density liquid to above ground.

The plenum or expansion chamber 9 has a first opening which coincides with the cyclone chamber input or inlet opening 7. The plenum 9 has a second or input opening 18 which is smaller in cross-sectional area than the cross-sectional area of the plenum 9 intermediate the opening 18 and the first opening and is spaced from the first opening thereof at the input opening 7. The spacing between the first and second openings and the dimensions of the chamber 9 are selected so that the velocity of the input stream, at least by the time it reaches the cyclone chamber input opening 7 (which coincides with the first opening of the plenum 9), is substantially reduced, i.e. by 30% or more, as compared to the input stream velocity at the second opening 18. Preferably, the velocity is reduced prior to reaching the chamber inlet 7 and is reduced to about one-half of the stream velocity at the second opening 18.

The purpose of the plenum 9 and the slowing of the stream velocity is to provide a smooth comparatively uniform flow of the input stream to the input opening 7 and to minimize short-circuiting of portions of the liquid between the second, or input inlet 18, and the cyclone inlet 7. Thus, when the stream to be treated enters the expansion chamber 9 through the opening 18 at high velocity and the dimensions of the chamber 9 and the distance between the opening 18 and the input opening 7 of the cyclone 1 are properly selected, the stream velocity decreases as the stream flows from the opening 18 to the cyclone input opening 7. As a result, the flow of the stream into the opening 7 is comparatively uniform. As the stream enters the cyclone, the velocity increases because the cross-sectional area of the cyclone chamber 6 is less than the cross-sectional area of the expansion chamber 9. The latter cross-section is also larger than the cross-sectional area of the stream input opening 18.

The second opening 18 is laterally offset with respect to the longitudinal axis 5. Preferably also, the opening 18 opens in the direction parallel to the axis 5, as shown in the drawings so that a connector, such as the connector 19 for a hose 20, need not extend radially outwardly from the hydrocyclone 1.

Usually, the hose 20 will be connected to a submersible pump which supplies underground liquid to be processed, e.g. oil and brine, at high pressure to the second opening 18. The opening 18 is sized to match the pump or the inlet flow rate in order to minimize line losses. The waste product, e.g. the high density constituent, or constituents, such as brine, can be removed through the waste outlet 21 and returned to the underground liquid or liquid pool below the hydrocyclone 1. If desired, or found to be necessary, the waste outlet 21 can be connected to a submersible pump which removes the waste product from the portion of the hydrocyclone 1 below, and spaced from, the lower end of the inner shell 4 or an electric motor operable valve can be used to regulate the rate of flow.

As occurs in prior art hydrocyclones, the light density liquid, e.g. oil, will flow from the chamber outlet opening 10 upwardly through the duct 12 provided by the bore of the inner shell 3 and then out of the tubular extension 13 from which it is conveyed to other processing equipment or storage above ground.

If the hydrocyclone 1 is submerged in liquid to be processed and the pressure of the liquid is sufficient to provide the desired cyclone flow, the pump, hose 20 and connector 19 can be omitted. However, in such case, it can be necessary to connect a submersible pump, or an electrically operable control valve to the waste outlet 21 to remove the waste constituent, e.g. high density brine, from the hydrocyclone 1 and/or to the outlet 13 to convey the light density liquid to the surface.

Although not necessary, at least a portion of the wall 14 of the plenum 9 (or 9a—FIG. 3) is curved, as shown in the drawings, to provide a smooth transition from the opening 18 to the chamber inlet opening 7. Such curvature of one or more portions of the wall 14 can help in eliminating eddys in the input stream and losses caused by sharp transitions.

Figure 3:
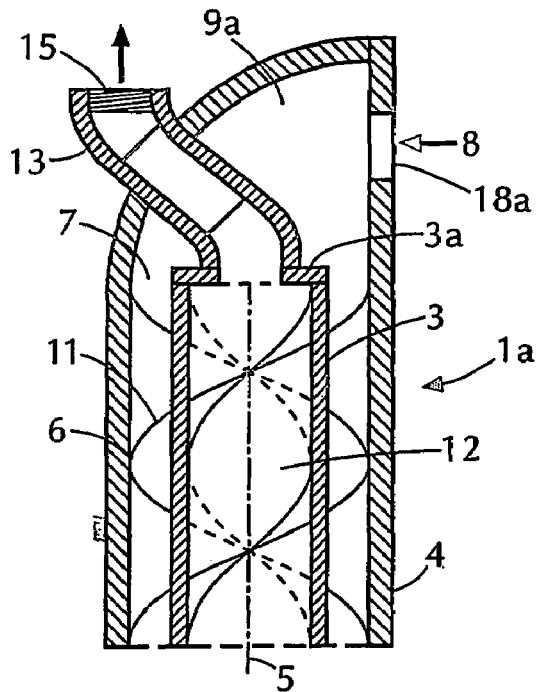
FIG. 3 is similar to FIG. 2 but illustrates an alternative embodiment in which the input stream is supplied through an opening in a wall of an expansion chamber and omits the connectors shown in FIG. 2.

If the hydrocyclone 1 is submerged in liquid to be processed and the pressure of the liquid is sufficient to provide the desired cyclone flow, the hydrocyclone 1a illustrated in FIG. 3 can be used. However, as described hereinbefore in connection with the embodiment in which the hose 20 and connector are omitted, it can be necessary to connect a submersible pump or control valve to the waste outlet 21 to remove the waste constituent from the hydrocyclone 1 and/or to the outlet 13 to convey the light density liquid to the surface.

Figure 2:
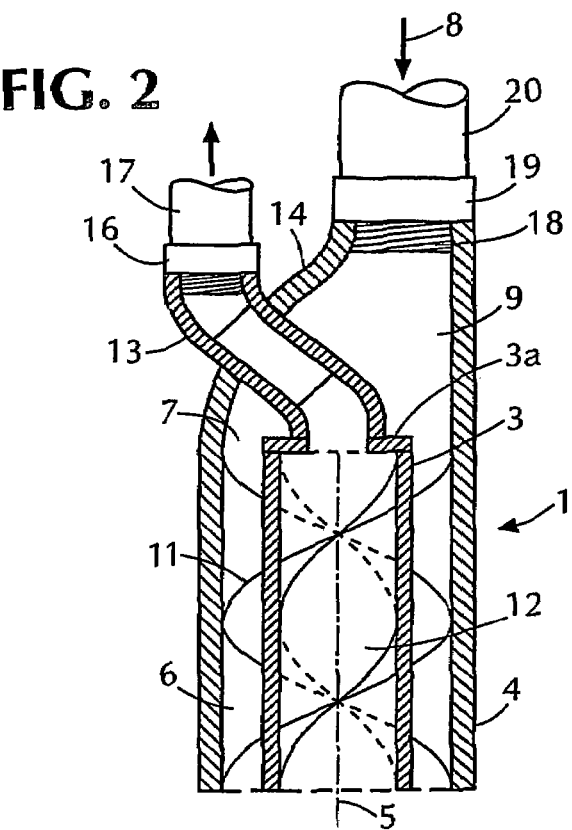
FIG. 2 is an enlarged, fragmentary view of a portion of the hydrocyclone shown in FIG. 1 with connectors for supplying the mixed phase input stream and removing a separated constituent of the stream.

The alternate embodiment illustrated in FIG. 3 is the same as the embodiment illustrated in FIGS. 1 and 2 except for the configuration of the plenum 9a and the replacement of the opening 18 which opens in the direction parallel to the axis 5 by an opening 18a in the wall of the plenum 9a which opens transversely to the longitudinal axis 5, e.g. perpendicularly to the axis 5. Thus, the liquid stream to be processed enters at high velocity into the plenum 9a where the velocity is reduced, preferably to about one-half, and the reduced velocity liquid stream, which has a better constituent distribution, then enters the cyclone chamber 6 through the inlet opening 7 and then accelerates in the cyclone chamber 6.

Figure 4:
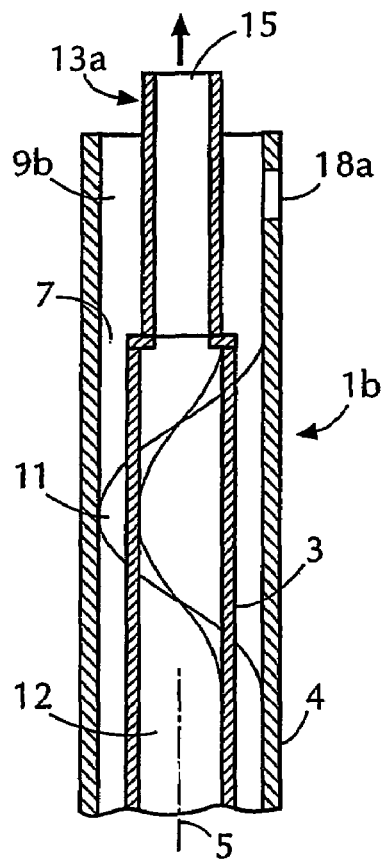
FIG. 4 is similar to FIG. 3 but illustrates a modification of the embodiment illustrated in FIG. 3.

If the input opening for the stream to be treated is in an extension of the outer shell of the cyclone, as illustrated in FIG. 3, it is not necessary to offset the opening 15 laterally of the axis 5. Thus, as illustrated in FIG. 4, the inner shell 3 of the hydrocyclone 1b can be provided with a tubular extension 13a which is co-axial with the axis 5 and through which the light density liquid or liquids pass from the duct 12 to the opening 15. Such disposition of the extension 13a eliminates the necessity for a bent tube 13 and keeps all of the outlet tube within a circle lying in a plane perpendicular to the axis 5 and having a radius equal to the radius of the outer shell 4. Of course, the tube 13a can be laterally offset from the axis 5 but within such a circle.

In FIG. 4, a plenum 9b for reducing the velocity of the input stream in advance of the cyclone opening 7 to about one-half the velocity of the stream at the input opening 18b is provided by an extension of the outer shell 4 and the outer surface of the tube 13a. If desired, the extension of the outer shell 4, which forms the outer wall of the plenum 9b can be shaped to provide improved flow of the input stream, e.g. it can be curved as illustrated in FIG. 3.

Figure 5:
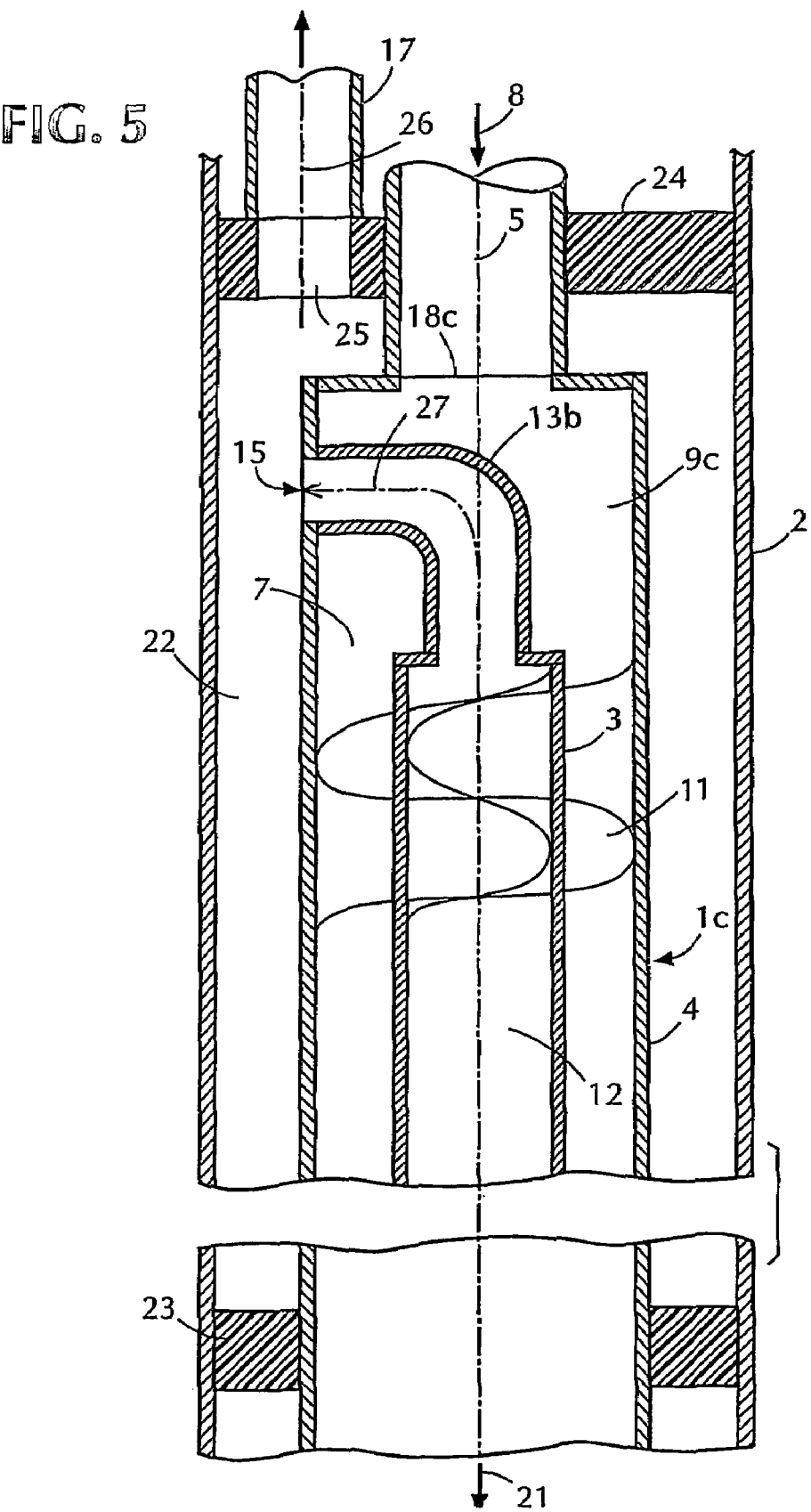
FIG. 5 is a diagrammatic elevation, cross-sectional and fragmentary view of a modification of the embodiment illustrated in FIG. 1.

FIG. 5 illustrates diagrammatically and in cross-section a modification of the upper portion of the hydrocyclone 1 illustrated in FIGS. 1 and 2. The lower portion of the hydrocyclone 1c has been omitted in FIG. 5 but can be the same as the lower portion of the hydrocyclone 1 illustrated in FIG. 1.

In the embodiment illustrated in FIG. 5, the input opening 18c of the plenum or expansion chamber 9c is coaxial with the longitudinal axis 5 and opens in the direction parallel to the axis 5. A tubular extension 13b of the inner shell 3 has an opening 15 which opens into the space 22 between the outer shell 4 and the well pipe or casing 2. The opening 15 opens in the direction perpendicular to the axis 5 and to the exterior of the plenum 9c which, as in the previously described embodiments, is dimensioned to provide a substantial reduction of the velocity of the input stream as it flows from the input opening 18c to the input or inlet opening 7 of the cyclone.

The space 22 is closed at its lower end (as viewed in FIG. 5) by a seal 23 which can be a conventional oil well packer. Above the opening 15, the space 22 is similarly sealed by a seal 24 which has an opening 25 to which the output hose 17 is coupled in any conventional manner.

Thus, the light density constituent flows from the duct 12 through the tubular extension 13b into the space 22 and then through the opening 25 as indicated by the lines 26 and 27 in FIG. 5.

As mentioned hereinbefore, an objective of the invention is to provide a hydrocyclone which can be readily fed into a hole lined with a pipe or otherwise, and positioned below ground, e.g. thousands of feet below ground, where the hydrocyclone processes a mixed phase liquid without having to pump the mixed phase liquid above ground or dispose of waste, undesired liquid above ground. Accordingly, it is necessary that the maximum radial dimension of the hydrocyclone be less than the internal dimension of the hole and if the hole has an arcuate bend, the maximum radial dimension and the overall axial length of the hydrocyclone must be correlated so that the hydrocyclone can be fed around the bend. Also, the diameter of the cyclone must be large enough to achieve adequate flow within the cyclone.

For these reasons, in preferred embodiments, all parts of the hydrocyclone exterior to the cyclone chamber are disposed and sized so that they fit within a circle lying in a plane perpendicular to and centered on the longitudinal axis 5 of the hydrocyclone 1 and having a radius not more than 30% greater than the radius of the outer surface of the outer shell 4 forming the outside wall of the cyclone chamber. Thus, in the embodiments illustrated in the drawings, the parts exterior to the cyclone chamber 6, namely, the plenum 9 or 9a, the tubular extension 13, the stream input opening 18 or 18a and the waste outlet 21 are within a circle centered on, and in a plane perpendicular to, the longitudinal axis 5 and having a radius not more than 30% greater than the radius of the outer surface of the outer shell 4. Preferably, all such parts are substantially within such a circle having a radius not greater than the radius of the outer surface of the outer shell 4.

If, for example, the hydrocyclone 1 is to be fed around a bend of forty foot radius in a well pipe or casing with a five inch inside diameter and the parts exterior to the cyclone chamber 6 are within such a circle have a radius of 4 inches, the overall axial length of the hydrocyclone should not be more than 7 feet.

Figure 6:
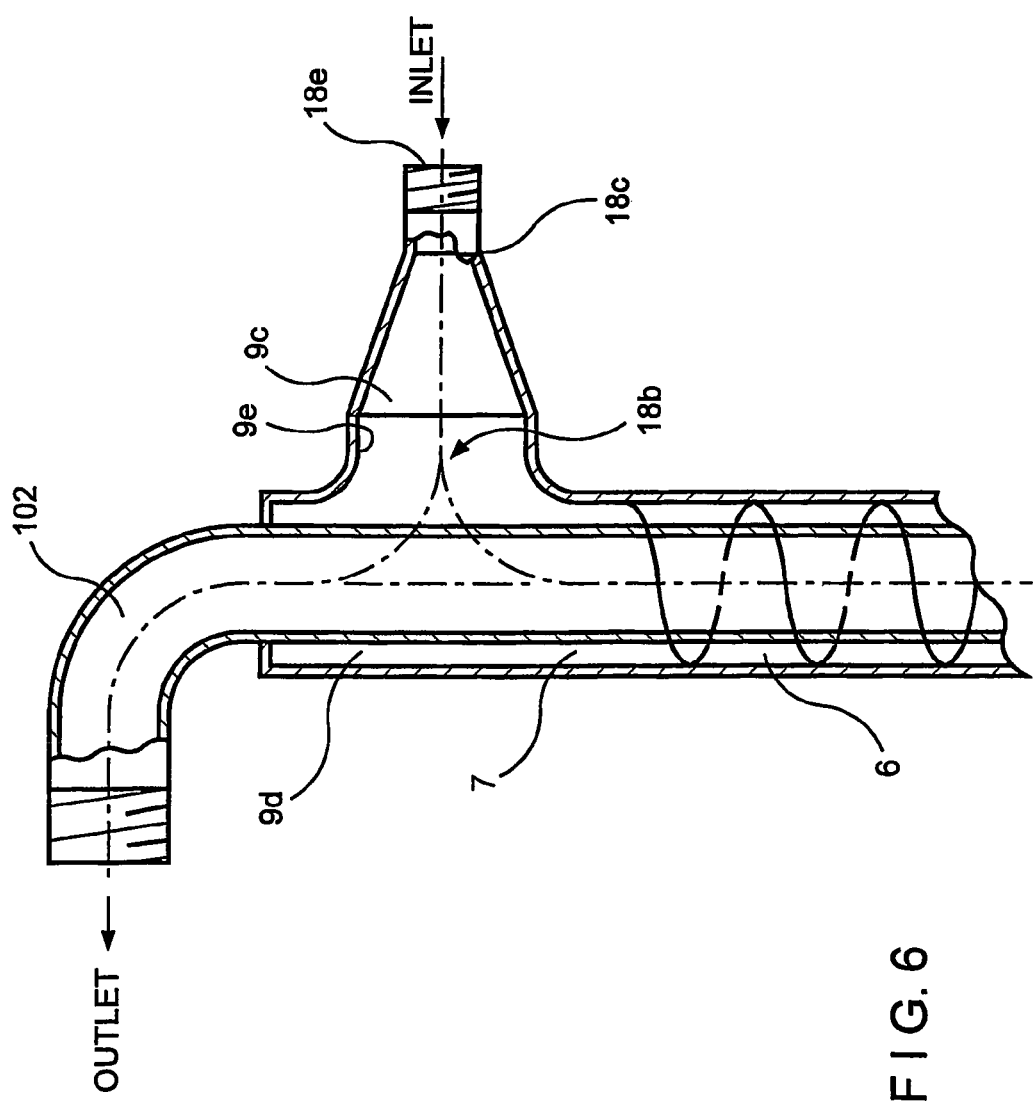
FIG. 6 is a cross-sectional view of an upper portion of a further embodiment of a hydrocyclone of the invention.

The dimensions of a preferred embodiment of the hydrocyclone of the type illustrated in FIGS. 1 and 2 which is intended to be fed into a rectilinear pipe having a five-inch inside diameter and the pressure differential across the cyclone is 150 psi, are as follows:

| Part | Dimensions |
| --- | --- |
| outer shell 4 | outside surface diameter 3.5 in. |
| | length 6.5 feet |
| inside shell 3 | radial spacing of outside surface from inside surface of outer shell 4 - 0.8 in. |
| | bore size - 1.9 in. |
| | length - 6.5 feet |
| plenum 9 or 9a | outlet opening diameter 3.08 in. |
| | input opening 18 diameter 1.61 in. |
| | input opening 18 to inlet opening 7 distance 3.5 in. |
| tubular extension 13 | outside diameter 1.08 in. |
| | inside diameter .824 in. |
| | within circle of 2.25 in. radius |
| input opening 18 or 18a | diameter 1.61 in. |
| | within circle of 1.75 in. radius |
| waste outlet 21 | within circle of outside shell 4 |
| overall length | 8 feet |

Where the constraints of borehole limitations are not present, the novel structure of the expansion plenum can be applied in a version of the hydrocyclone for above ground use. FIG. 6 shows an embodiment, which is essentially a variation of the FIG. 4 embodiment. Where limitations on the radial dimension are not of primary concern, the plenum 9c may be advantageously located radially outside of the outer shell. Although shown in a preferable orientation being generally perpendicular to the longitudinal axis of the hydrocyclone, the plenum 9c may also approach the outer shell at an angle. Outside of a well bore, the inlet mixture would in most cases be conveyed into the apparatus via a pipe or tube. Said pipe or tube would connect with an outside opening 18e of the plenum 9c, and the mixture would then pass through a second opening 18c. The second opening 18c would then lead into an expansion chamber, preferably concentric with the inlet, which is dimensioned such that the velocity of the input stream is reduced as set forth above in connection with the other embodiments. The expansion chamber has an increasing radius along its axis as it approaches and opens through first opening 18b into a chamber 9d formed between the outer surface of the inner shell and inner surface of the outer shell, the chambers 9c and 9d forming a T shape. From chamber 9d, the input mixture then flows downward into opening 7 into cyclone chamber 6 as described above. In this embodiment, opening 7 may be merely an extension of the chamber 9d, located downward of the level of the inlet. The plenum 9c may be formed of a standard concentric reducer. While the external plenum 9c is dimensioned to reduce the velocity of the input as described in accordance with the invention, further turbulence can be reduced by conforming the diameter of the plenum 9c at a point 9e where it meets the chamber 9d (i.e. where it joins with the outer shell) to be substantially equal to the diameter of the inner surface of the outer shell 4.

Figure 7:
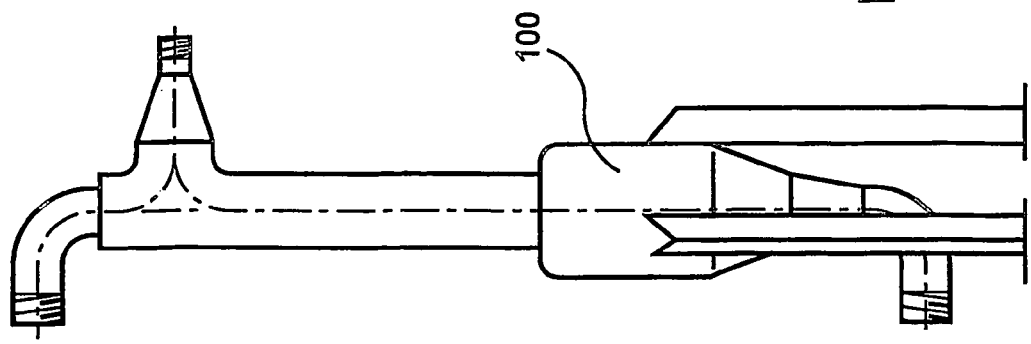
FIG. 7 is a diagrammatic elevation view of the further embodiment of FIG. 6, showing an optional expanded diameter solids collection chamber.

Again, without the limitations of the down hole use, further enhancements may be provided. As shown in FIG. 7, a solids collection chamber 100 of expanded diameter may be provided adjacent the solids fraction outlet. The expansion chamber is located between the bottom outlet of the helical portion of cyclone 10 and the bottom outlet 21. The chamber can be preferably tapered toward its lower end to match the exit diameter. This tapering is to aid in the drainage of solids and the prevention of collection zones. In addition, a light fraction outlet can be fitted with an elbow 102, preferably leading away in a generally horizontal direction, for ease of use.

Preferred embodiments of the present invention have been described and illustrated. It will be apparent to those skilled in the art that various modifications may be made without departing from the invention, which is defined in the claims, hereinafter.

What is claimed is:

1. A hydrocyclone for effecting separation of a combined phase input stream with at least two constituents comprising:
    inner and outer spaced shells which are concentric with a longitudinal axis and each of which has an inner surface and an outer surface, the outer shell having an inner surface radius with respect to said longitudinal axis which is greater than the radius of the outer surface of the inner shell with respect to said axis to form therebetween a cyclone chamber providing a helical path for the stream, the shells having an input opening therebetween at one end of the cyclone chamber for receiving the stream and an output opening therebetween at the opposite end of the cyclone chamber for discharging separated constituents of the stream;
    wherein the inner surface of the inner shell is spaced from the longitudinal axis and defines an inner shell bore which has one end at and which extends from the chamber output opening to adjacent the chamber input opening for conveying a separated constituent to an end of the bore adjacent the chamber input opening;
    at least one wall forming an expansion chamber which is within a circle lying in a plane perpendicular to and centered on the longitudinal axis and having a radius not more than 30% greater than the radius of the outer surface of the outer shell, said expansion chamber having a first opening which opens to the input opening of the cyclone chamber and a second opening spaced from the first opening for providing the input stream to the expansion chamber, the spacing of the first opening and the second opening and the dimensions of the expansion chamber being selected to substantially reduce the velocity of the input stream, at least by the time that the stream reaches the input opening of the cyclone chamber, with respect to the velocity of the input stream at the second opening of the expansion chamber; and a tubular extension of the inner shell extending from the end of the bore of the inner shell adjacent the input opening of the cyclone chamber to exteriorly of the expansion chamber.

2. The hydrocyclone of claim 1 wherein the second opening of the expansion chamber is laterally offset with respect to the longitudinal axis.

3. The hydrocyclone of claim 2 wherein the second opening opens in the direction substantially parallel to the longitudinal axis.

4. The hydrocyclone of claim 2 wherein the second opening of the expansion chamber is an opening in the outer shell and opens transversely to the longitudinal axis.

5. The hydrocyclone of claim 2 wherein said tubular extension of the inner shell has an outlet opening exteriorly of the expansion chamber which is laterally offset from said axis and which opens in the direction parallel to the longitudinal axis.

6. The hydrocyclone of claim 1 wherein said tubular extension passes through the expansion chamber and the portion of the tubular extension exterior to the expansion chamber is laterally offset from said axis.

7. The hydrocyclone of claim 1 wherein all cross-sections of the hydrocyclone perpendicular to said axis are not substantially larger than a circle centered on said axis and in a plane perpendicular to the longitudinal axis and having a radius substantially equal to the radius of the outer surface of the outer shell.

8. The hydrocyclone of claim 1 wherein the overall length of the hydrocyclone in the direction of said axis and the circumferential dimensions of the hydrocyclone are selected so that the hydrocyclone can traverse a bend in a pipe of five inches interior diameter and having a bend radius of forty feet.

9. The hydrocyclone of claim 1 wherein the expansion chamber reduces the velocity of the input stream at the input opening of the cyclone chamber to about one-half of the velocity of the input stream at the second opening.

10. The hydrocyclone of claim 1 wherein the tubular extension passes through the expansion chamber.

11. The hydrocyclone of claim 1 wherein the radial spacing between the inner and outer shells is small relative to the radius of the inner surface of the outer shell.

12. The hydrocyclone of claim 11 wherein the radial spacing between the inner and outer shells is less than about one-half of the radius of the inner surface of the outer shell.

13. A hydrocyclone for effecting separation of a combined phase input stream with at least two constituents comprising:
inner and outer spaced shells which are concentric with a longitudinal axis, the outer shell having a radius with respect to said longitudinal axis which is greater than the radius of the inner shell with respect to said axis and the inner and outer shells form therebetween a cyclone chamber providing a helical path for the stream, the shells having an input opening therebetween at one end of the cyclone chamber for receiving the stream and an output opening therebetween at the opposite end of the cyclone chamber for discharging separated constituents of the stream;

the inner shell having a bore which has one end at the chamber output opening and which extends from the chamber output opening to adjacent the chamber input opening for conveying a separated constituent to an end of the bore adjacent the chamber input opening;

at least one wall forming an expansion chamber with a first opening which opens to the input opening of the cyclone chamber and a second opening which opens in the direction substantially parallel to the longitudinal axis and which is spaced from the first opening for providing the input stream to the expansion chamber, the spacing of the first opening and the second opening and the size of the expansion chamber being selected to substantially reduce the velocity of the input stream at the input opening of the cyclone chamber with respect to the velocity of the input stream at the second opening of the expansion chamber; and a tubular extension of the inner shell extending from the end of the bore of the inner shell adjacent the input opening of the cyclone to exteriorly of the expansion chamber.

14. The hydrocyclone of claim 13 wherein the second opening of the expansion chamber is laterally offset with respect to the longitudinal axis.

15. The hydrocyclone of claim 14 wherein said tubular extension of the inner shell has an outlet opening exteriorly of the expansion chamber which is laterally offset from said axis and which opens in the direction parallel to the longitudinal axis.

16. The hydrocyclone of claim 13 wherein said tubular extension passes through the expansion chamber and the portion of the tubular extension exterior to the expansion chamber is laterally offset from said axis.

17. The hydrocyclone of claim 13 wherein all cross-sections of the hydrocyclone perpendicular to said axis are not substantially larger than a circle centered on said axis and in a plane perpendicular to the longitudinal axis and having a radius substantially equal to the radius of the outer surface of the outer shell.

18. The hydrocyclone of claim 13 wherein the expansion chamber reduces the velocity of the input stream at the input opening of the cyclone chamber to not more than about one-half of the velocity of the input stream at the second opening.

19. The hydrocyclone of claim 13 wherein the radial spacing between the inner and outer shells is small relative to the radius of the inner surface of the outer shell.

20. The hydrocyclone of claim 19 wherein the radial spacing between the inner and outer shells is less than about thirty percent of the radius of the inner surface of the outer shell.

21. A hydrocyclone for effecting separation of a combined phase input stream with at least two constituents comprising:
inner and outer spaced shells which are concentric with a longitudinal axis, the outer shell having a radius with respect to said longitudinal axis which is greater than the radius of the inner shell with respect to said axis and the inner and outer shells form therebetween a cyclone chamber providing a helical path for the stream, the shells having an input opening therebetween at one end of the cyclone chamber for receiving the stream and an output opening therebetween at the opposite end of the cyclone chamber for discharging separated constituents of the stream;

the inner shell having a bore which has one end at the chamber output opening and which extends from the chamber output opening to adjacent the chamber input opening for conveying a separated constituent to an end of the bore adjacent the chamber input opening;

an expansion chamber with a first opening which opens to the input opening of the cyclone chamber and a second opening which opens to exterior of the cyclone chamber and which is spaced from the first opening for providing the input stream to the expansion chamber, the spacing of the first opening and the second opening and the size of the expansion chamber being selected to substantially reduce the velocity of the input stream at the input opening of the cyclone chamber with respect to the velocity of the input stream at the second opening of the expansion chamber; and a tubular extension of the inner shell extending from the end of the bore of the inner shell adjacent the input opening of the cyclone to exteriorly of the expansion chamber.

22. The hydrocyclone of claim 21 wherein the expansion chamber reduces the velocity of the input stream at the input opening of the cyclone chamber to not more than about one-half of the velocity of the input stream at the second opening.

23. The hydrocyclone of claim 21 wherein the radial spacing between the inner and outer shells is small relative to the radius of the inner surface of the outer shell.

24. The hydrocyclone of claim 21 wherein the radial spacing between the inner and outer shells is less than about thirty percent of the radius of the inner surface of the outer shell.

25. The hydrocyclone of claim 21 wherein the expansion chamber is located exteriorly of the cyclone chamber.

26. The hydrocyclone of claim 25 wherein the expansion chamber is situated generally along a longitudinal axis perpendicular to the axis of the cyclone chamber.

27. The hydrocyclone of claim 21 wherein a diameter of the expansion chamber at the first opening is approximately equal to at least a diameter of the inner surface of the outer shell.

28. The hydrocyclone of claim 21 wherein the expansion chamber comprises a concentric reducer.

29. The hydrocyclone of claim 21 further comprising a second expansion chamber located between an exit from the helical path and the output opening.

* * * * *